United States Patent
Kojima et al.

(10) Patent No.: US 7,114,895 B2
(45) Date of Patent: Oct. 3, 2006

(54) MACHINE TOOL PROVIDED WITH COOLING MECHANISM

(75) Inventors: Kunio Kojima, Yamanashi (JP); Keiko Yamanaka, Ibaraki (JP)

(73) Assignee: Fanuc Ltd, Yamanashi (JP)

( * ) Notice: Subject to any disclaimer, the term of this patent is extended or adjusted under 35 U.S.C. 154(b) by 54 days.

(21) Appl. No.: 11/070,662

(22) Filed: Mar. 3, 2005

(65) Prior Publication Data

US 2005/0196246 A1    Sep. 8, 2005

(30) Foreign Application Priority Data

Mar. 4, 2004    (JP) .............................. 2004-060288

(51) Int. Cl.
*B23Q 11/12* (2006.01)
(52) U.S. Cl. ...................... 409/135; 409/231; 409/235; 82/900; 83/170
(58) Field of Classification Search ................ 409/135, 409/136, 235, 231–232; 408/56; 82/900; 83/170; 451/7; 407/11
See application file for complete search history.

(56) References Cited

U.S. PATENT DOCUMENTS

| 5,487,629 A * | 1/1996 | Watanabe .................... 409/136 |
| 5,799,553 A * | 9/1998 | Billatos ........................ 82/1.11 |
| 5,803,683 A * | 9/1998 | Turchan ...................... 409/277 |
| 7,013,986 B1* | 3/2006 | Mikiya et al. ............... 173/114 |
| 2005/0129561 A1* | 6/2005 | Heizer ...................... 418/201.1 |
| 2005/0181710 A1* | 8/2005 | Linnenbrink ................. 451/47 |
| 2006/0108134 A1* | 5/2006 | Mikiya et al. ............... 173/104 |

FOREIGN PATENT DOCUMENTS

| JP | 63-179048 | 11/1988 |
| JP | 05-138493 | 6/1993 |
| JP | 5-74749 | 10/1993 |

OTHER PUBLICATIONS

Machine Translation from JPO Website of JP-05-138493-A, 6 pages.*
European Search Report for Application No. EP 05 25 1267.0-2302 dated Jul. 22, 2005.

* cited by examiner

*Primary Examiner*—Erica Cadugan
(74) *Attorney, Agent, or Firm*—Staas & Halsey LLP

(57) ABSTRACT

A spindle motor as a heating element and a spindle head having a spindle that is driven by the spindle motor are coupled to each other by a cooling flange. The cooling flange is provided with a cooling passage, the cross-sectional area of which gradually increases with distance from its gas inlet toward its gas outlet. When a high-pressure gas is injected into the cooling passage through the gas inlet, it is adiabatically expanded and cooled by the cooling passage having the gradually increasing cross-sectional area. Thus, the cooling flange restrains heat generated from the spindle motor from being transmitted to the spindle head.

4 Claims, 2 Drawing Sheets

MACHINE TOOL PROVIDED WITH COOLING MECHANISM

BACKGROUND OF THE INVENTION

1. Field of the Invention

The present invention relates to a machine tool provided with a cooling mechanism for restraining its thermal deformation.

2. Description of the Related Art

For a spindle head, column, and other structures that constitute a machine tool, thermal distortion by heat from a heating element, such as a spindle motor, is a serious problem that results in lowering of machining accuracy. A change in attitude of the spindle head or the column for guiding the movement of the head, among other undesirable results of thermal distortion, involves tilting, in particular, so that it cannot be corrected by a thermal displacement correction program with which a displacement in a direction parallel to a coordinate axis is corrected. If the spindle head or the column is tilted by heat from the spindle motor or any other heating element, the axis of the spindle tilts, and a tool that is attached to the spindle also tilts. In consequence, the machining accuracy lowers.

In a conventional method to prevent the change in attitude, the heating element is directly cooled or heat conduction from the heating element to its surrounding structures is restrained.

For example, the spindle is driven by a built-in motor, and a large number of air passages with a large cross-sectional area are formed at spaces in the axial direction, substantially entirely covering the outer periphery of a stator of the built-in motor. Compressed air is injected into the air passages through jets with a small cross-sectional area, whereupon the built-in motor, a source of heat generation, is cooled taking advantage of a temperature drop that is attributable to adiabatic expansion of the compressed air. Thermal distortion of a column head can be avoided by preventing heat from the source of heat generation from being transmitted to the spindle head, column, or any other structures of the machine tool (see Japanese Patent Application Laid-open No. 5-138493).

In another known arrangement, a headstock that is located between a spindle head having a spindle motor built-in and a column for guiding the movement of the spindle head is provided with a cooling fluid passage through which a cooled cooling fluid is circulated. In this case, change in attitude of a spindle and the like is restrained by using the cooling fluid to prevent heat generated from the spindle motor from being transmitted to other members (see Japanese Utility Model Application Laid-open No. 5-74749).

In still another known arrangement, a cooling flange is mounted between a spindle motor and a headstock that is fitted with a spindle, whereby cooling oil can be circulated in the cooling flange to prevent heat generated in the spindle motor from being transmitted to the headstock (Japanese Utility Model Application Laid-open No. 63-179048)

In the case where the spindle motor or other heating element is cooled directly, as described in Japanese Patent Application Laid-open No. 5-138493, a cooling apparatus is shaped so as to enclose the heating element and tends to be large-sized. Since heat as much as the heat generated from the heating element must be removed, moreover, there may be a demand for peripheral equipment, such as a temperature controller, for preventing the temperature of a refrigerant from excessively increasing, in some cases.

In the case where the heat conduction from the heating element to its surrounding structures is restrained by means of a cooling mechanism that is provided in the middle of a path of conduction, as described in Japanese Utility Model Applications Laid-open Nos. 5-74749 and 63-179048, on the other hand, heat conduction in only a limited direction is expected to be restrained, so that the quantity of heat to be removed is small. However, the method in which a refrigerant is simply run in the course of the heat conduction cannot produce a high cooling effect.

SUMMARY OF THE INVENTION

According to the present invention, a machine tool provide with a cooling mechanism is provided. The cooling mechanism is provided in the middle of a path of heat conduction from a heating element of the machine tool to a structure around the heating element. The cooling mechanism restrains the heat conduction from the heating element to the structure by utilizing a cooling effect produced by adiabatic expansion of a gas.

The machine tool provided with a cooling mechanism according to this invention may assume the following aspects.

The heating element is a spindle motor, the structure is a spindle head, and the spindle motor and the spindle head are coupled to each other by a member provided with the cooling mechanism.

The machine tool is a built-in machine tool of which a spindle motor coupled to a spindle thereof is built in a spindle head, the heating element is the spindle motor, and the cooling mechanism is provided in that part of a headstock connecting a column and the spindle head of the machine tool which is situated closer to the spindle motor.

The cooling mechanism is provided with a cooling passage, having a gas inlet at one end and a gas outlet at the other end, and gas supply means for injecting a gas at a pressure higher than the atmospheric pressure into the cooling passage through the gas inlet. The cross-sectional area of the cooling passage gradually increases with distance from the gas inlet toward the gas outlet so that the gas injected into the cooling passage is adiabatically expanded and cooled as the gas passes through the cooling passage.

According to the present invention, the heat conduction from the heating element to another member is restrained by utilizing the phenomenon that the gas as a refrigerant is cooled by adiabatic expansion. Thus, as compared with the case where the refrigerant gas is simply run, the heat conduction can be restrained more efficiently, and change in attitude of the spindle head, column, and other structures of the machine tool can be prevented to improve machining accuracy.

BRIEF DESCRIPTION OF THE DRAWINGS

The above and other objects and features of the invention will be more apparent from the ensuing detailed description of embodiments taken with reference to the accompanying drawings, in which.

DESCRIPTION OF THE EMBODIMENTS

Figure 1:
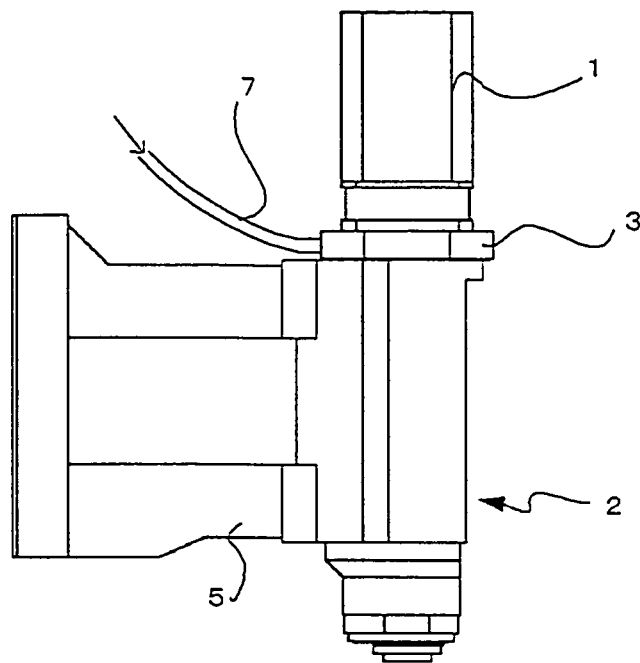
FIG. 1 is a view showing a principal part of a first embodiment of a machine tool provided with a cooling mechanism according to the invention, the machine tool having a spindle motor as a component independent of its spindle.

A first embodiment of a machine tool provided with a cooling mechanism according to the present invention will now be described with reference to FIGS. 1 and 2.

The machine tool of the present embodiment is a machining center using as its spindle motor 1 a motor that is located as a part independent of a spindle. As shown in FIG. 1, a headstock 5 of a spindle head 2 moves in the vertical direction of FIG. 1, guided by a column (not shown). The spindle motor 1 is mounted on the spindle head 2 through a cooling flange 3. The spindle (not shown) in the spindle head 2 is driven as the spindle motor 1 is operated.

Figure 2:
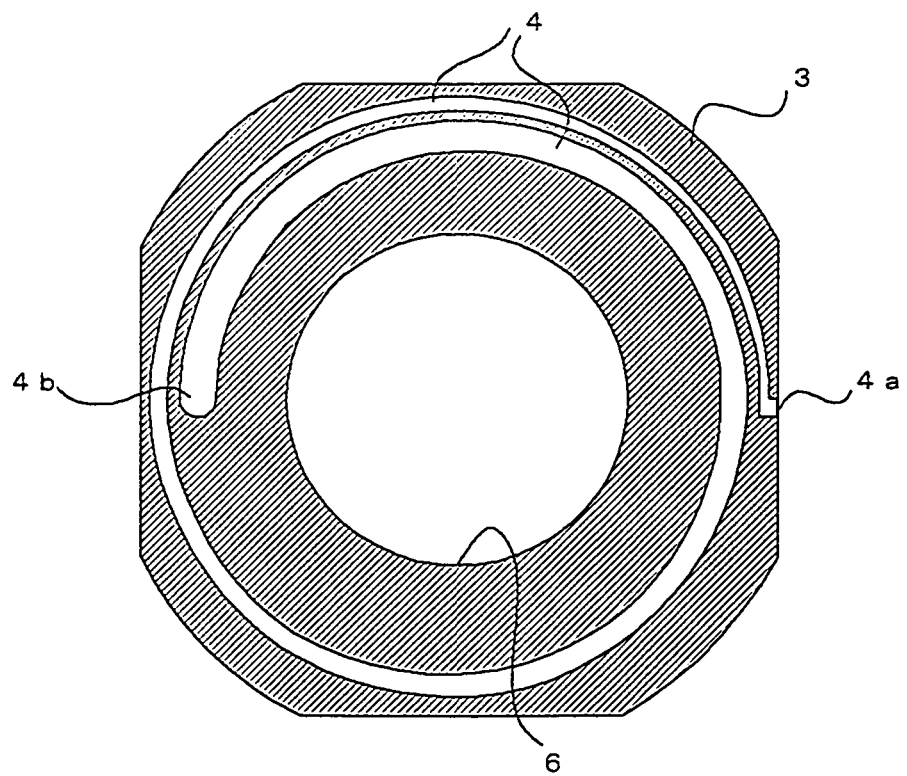
FIG. 2 is a sectional view of a cooling flange of the machine tool of FIG. 1.

FIG. 2 is a view showing a cross section of the cooling flange 3 in a direction perpendicular to the shaft axis of the spindle motor 1. The flange 3 is about 20 to 30 mm thick and has therein a cooling passage 4 through which passes air or some other gas for use as a refrigerant. The cooling passage 4 is a convolute passage having a gas inlet 4a at one end and a gas outlet 4b at the other end. The cross-sectional area of the passage 4 gradually increases with distance from the gas inlet 4a toward the gas outlet 4b. In FIG. 2, numeral 6 denotes a hole through which a motor shaft (not shown) of the spindle motor 1 passes. Further, the gas inlet 4a is connected with a tube 7 through which a high-pressure gas is introduced into the cooling passage 4 by a high-pressure gas source, such as a compressor (not shown).

When the machine tool (machining center) is operated, the gas (e.g., air) that is kept at a pressure higher than the atmospheric pressure is injected into the cooling passage 4 through the tube 7 by the high-pressure gas source. Heat that is generated from the spindle motor 1 when the motor 1 is driven is induced to be transmitted to the spindle head 2 via the cooling flange 3. Since the cross-sectional area of the cooling passage 4 gradually increases toward the gas outlet 4b, however, the high-pressure gas injected into the cooling flange 3 is adiabatically expanded so that its temperature drops. In consequence, the flange 3 absorbs heat, whereupon a path of conduction of the heat generated from the spindle motor 1 is cooled. Thus, heat conduction to the spindle head 2 is restrained.

According to the present embodiment, as described above, the cooling effect is enhanced by utilizing the phenomenon that the gas is adiabatically expanded and cooled as the cross-sectional area of the cooling passage gradually increases toward the gas outlet 4b, instead of using a cooling method in which the high-pressure gas as the refrigerant is simply passed through the cooling flange 3. By doing this, the heat generated from the spindle motor 1 is prevented more securely from being transmitted to any other structure, such as the spindle head.

A second embodiment of the machine tool provided with the cooling mechanism according to the present invention will now be described with reference to FIGS. 3 and 4.

The machine tool of the present embodiment is a machine of a built-in motor type. In the built-in-motor type machine tool, heat generated from a spindle motor and a bearing is transmitted to a shaft, spindle head, column, etc., thereby expanding thermally them. Since the shaft extends mainly in its length direction only, it cannot easily tilt the machine. If the heat is transferred to the spindle head or column, however, the machine body may be tilted.

Figure 3:
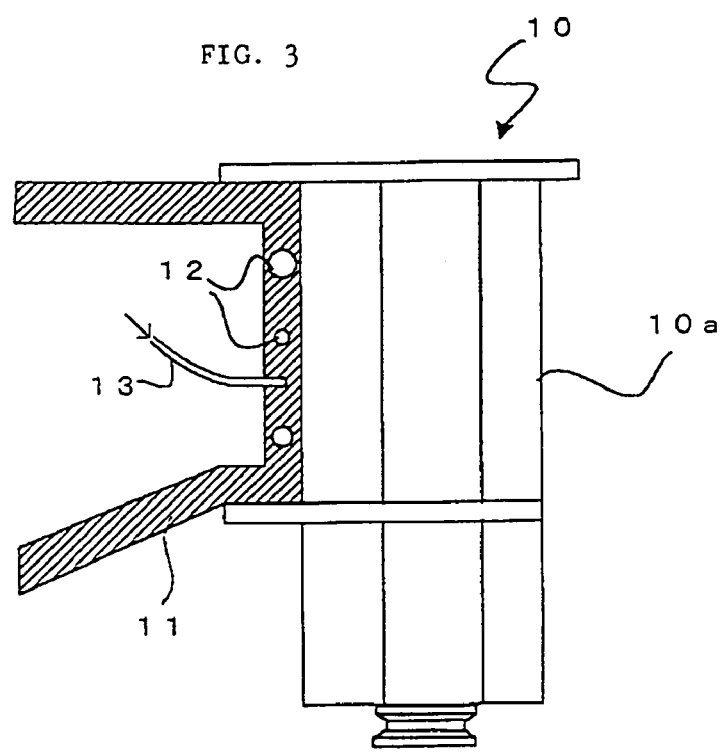
FIG. 3 is a view showing a principal part of a second embodiment of the machine tool provided with the cooling mechanism according to the invention, the machine tool being of a built-in motor type.

In the present embodiment, therefore, a spindle head 10 is composed integrally of a spindle motor 10a and a spindle (not shown), and a cooling passage 12 is provided in that part of a headstock 11 of the spindle head 10 which is situated closer to the spindle motor 10a, as shown in FIG. 3.

Figure 4:
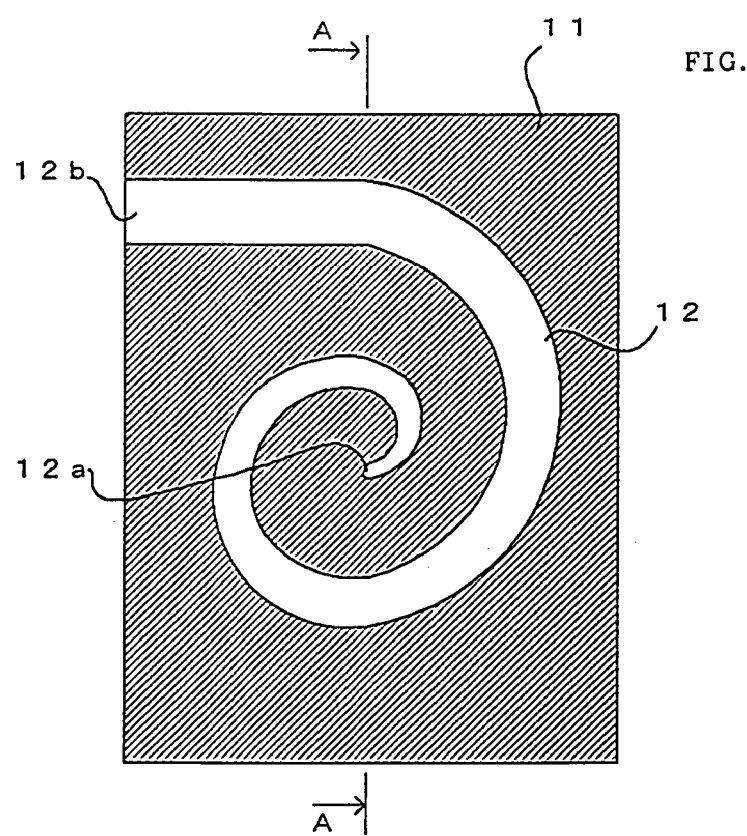
FIG. 4 is a sectional view of that part of a headstock of FIG. 3 which is situated closer to a motor.

FIG. 4 is a sectional view of the part of the headstock 11 of FIG. 3 near the spindle motor 10a, taken in the direction perpendicular to the shaft axis of the motor. On the other hand, FIG. 3 is a sectional view of a part of the headstock 11 taken along line A—A of FIG. 4. The headstock 11 is hatched in FIG. 3.

As shown in FIG. 4, the cooling passage 12, which is located in the part of the headstock 11 near the spindle motor 10a, is a convolute passage having a gas inlet 12a at one end and a gas outlet 12b at the other end. The cross-sectional area of the passage 12 gradually increases with distance from the gas inlet 12a toward the gas outlet 12b. The gas inlet 12a is connected with a tube 13 through which a high-pressure gas is supplied by a high-pressure gas source (not shown).

When the machine tool is operated, the gas that is kept at a pressure higher than the atmospheric pressure is injected into the cooling passage 12 through the tube 13 and the gas inlet 12a by the high-pressure gas source. Since the cross-sectional area of the cooling passage 12 gradually increases toward the gas outlet 12b, the gas in the passage 12 is adiabatically expanded and cooled. Thus, the heat generated from the built-in motor (spindle motor) and the bearing can be restrained from being transmitted to the headstock or the column.

In the cooling mechanism of the present invention, as described above, heat conduction is restrained by utilizing a temperature drop that is caused by the adiabatic expansion of the refrigerant gas. Thus, the heat conduction can be efficiently stopped or restrained by only running the refrigerant gas through the cooling passage that constitutes the cooling mechanism. The cooling passage, which has a gradually increasing cross-sectional area, is formed in a member located between a source of heat generation, such as the spindle motor or built-in motor, and the machine tool or some other structure.

Although a heating element from which heat conduction is restrained is the spindle motor according to each of the foregoing embodiments, it is not limited to the spindle motor. If there are any heating elements (e.g., various motors) that influence the machining accuracy, the cooling mechanism of the present invention may be provided between these heating elements and some other structure.

What is claimed is:

1. A machine tool provided with a cooling mechanism, the cooling mechanism being provided in the middle of a path of heat conduction from a heating element of the machine tool to a structure around the heating element, whereby the heat conduction from the heating element to the structure is restrained by utilizing a cooling effect produced by adiabatic expansion of a gas through a spiral passage whose cross-sectional area gradually increases from a gas inlet thereof to a gas outlet thereof.

2. The machine tool provided with a cooling mechanism according to claim 1, wherein the heating element is a spindle motor, the structure is a spindle head, and the spindle motor and the spindle head are coupled to each other by a member provided with the cooling mechanism.

3. The machine tool provided with a cooling mechanism according to claim 1, wherein the machine tool is a built-in machine tool of which a spindle motor coupled to a spindle thereof is built in a spindle head, the heating element is the spindle motor, and the cooling mechanism is provided in that part of a headstock connecting a column and the spindle head of the machine tool which is situated proximal to the spindle motor.

4. The machine tool provided with a cooling mechanism according to any one of claims 1 to 3, wherein the spiral passage is a cooling passage, having the gas inlet at one end and the gas outlet at the other end, and gas supply means for injecting a gas at a pressure higher than the atmospheric pressure into the cooling passage through the gas inlet, and the gas injected into the cooling passage is adiabatically expanded and cooled as the gas passes through the cooling passage.

* * * * *